United States Patent
Lee

(10) Patent No.: US 7,961,435 B2
(45) Date of Patent: Jun. 14, 2011

(54) COMPOSITE SINGLE STRUCTURED HARD DISK DRIVE

(76) Inventor: Li-Yun Lee, Taipei Hsien (TW)

( * ) Notice: Subject to any disclaimer, the term of this patent is extended or adjusted under 35 U.S.C. 154(b) by 809 days.

(21) Appl. No.: 11/863,285

(22) Filed: Sep. 28, 2007

(65) Prior Publication Data
US 2008/0253023 A1    Oct. 16, 2008

(30) Foreign Application Priority Data

Apr. 12, 2007  (TW) ............................. 96205847 U

(51) Int. Cl.
*G11B 21/08* (2006.01)
(52) U.S. Cl. ................................... 360/246.7
(58) Field of Classification Search .................. None
See application file for complete search history.

(56) References Cited

U.S. PATENT DOCUMENTS

| | | | | |
|---|---|---|---|---|
| 6,057,990 | A | * | 5/2000 | Gilovich .................... 360/246.7 |
| 7,031,115 | B1 | * | 4/2006 | Gilovich .................... 360/264.4 |
| 7,199,981 | B2 | * | 4/2007 | Zabtcioglu ................ 360/266.2 |
| 2007/0035868 | A1 | * | 2/2007 | van Zyl ........................ 360/69 |

* cited by examiner

*Primary Examiner* — Mark Blouin

(57) ABSTRACT

A composite single structured hard disk drive, comprising: a machine casing having a power port and two signal I/O (input/output) ports at an outer surface thereof; an interior of the machine casing having a driving unit which is electrically connected to the power port; the driving unit being able to rotatably drive at least one recoding disk; two read/write modules (R/W modules) being installed, respectively, each R/W module having a rotatable arm set and a dynamic unit connected to the rotatable arm set; one end the rotatable arm set having at least one R/W head at a front end thereof; another end of the rotatable arm set having no the R/W head is connected to the dynamic unit; the dynamic unit being connected to the power port and being controlled by a processor in the substrate in the machine casing.

1 Claim, 11 Drawing Sheets

COMPOSITE SINGLE STRUCTURED HARD DISK DRIVE

FIELD OF THE INVENTION

The present invention relates to hard disks, and particularly to a composite single structured hard disk drive capable of receiving more than one recording disks. Moreover, in the composite single structured hard disk drive of the present invention, the RAID0 structure can be used. Furthermore, more disks and R/W heads can be arranged in the machine casing of the present invention so that the speed is increased and the backup copy can be prepared. Furthermore, as comparing with other RAID array, the number of hard disks is decreased.

BACKGROUND OF THE INVENTION

Generally, a computer uses a single one hard disk as a recoding and storage medium for normal storage data. With the increment of data in the computer, a plurality of hard disks are installed to a computer as a hard disk array.

Currently, a plurality of hard disk arrays are disclosed, such as RAID0, RAID1 to RAID5, RAID0+1, etc. RAID represents redundant array of independent disks. In these structures, the contents distributed in the prior art hard disks are integrated so as to have the advantages in data accessing and management. For example, for RAID0, one set of data is divided into a plurality of data stripes which are written to different areas of the disk. If it is desired to read data from the hard disk, the data can be read out in parallel and then are integrated as the original data. Since the data is processed in parallel, the processing speed is increased, but if the data is destroyed, it is possible that the whole hard disk array can not be read.

For RAID1, the data to be stored is mirrored to another one hard disk at the same time so that a backup copy is prepared. The defect is that the speed is identical to a non-RAID structure.

In RAID 10/01, the structures of the RAID0 and RAID1 are integrated. In that the data are mirrored to another copy and then are divided into a plurality of stripes. It has the advantages of increasing read/write speed and having a backup copy, but the cost is high because four disks are necessary. Moreover, only 50% capacity is used.

Moreover, in RAID5, other than storing data in different area of the hard disk, a parity check is used so as to have the function of increasing R/W speed, and the data can be checked in read and write operation, even the destroyed data can be restored, but in this structure, the cost is high.

Referring to FIGS. 1 and 1A, a prior art hard disk structure is disclosed. In that a single hard disk 10 has a machine casing 11 with a driving unit 12 therein for driving a disk 13 to rotate within the machine casing 11. A R/W module 14 includes a R/W head 15 and a rotatable arm set 17 which is driven by a dynamic unit 16. A power port 18 and a signal I/O port 19 are installed at an outer side of the machine casing 1. In one working period, only one R/W head reads date selectively in the disk 13. Thus it is a non-RAID structure and data can not be backup. If RAID structure is used, as the RAID0 or RAID1 are used, at least two hard disks are necessary. In RAID10/01 structure, four hard disks are necessary. In RAID5 structure, at least three hard disks are necessary. Other than space of the machine casing is wasted, the wires are intricately arranged disorderly, as illustrated in FIGS. 1B and 1C.

SUMMARY OF THE INVENTION

Accordingly, the primary object of the present invention is to provide a composite single structured hard disk drive capable of receiving more than one recording disks.

Moreover, in the composite single structured hard disk drive of the present invention, the RAID0 structure can be used. Furthermore, more disks and R/W heads can be arranged in the machine casing of the present invention so that the speed is increased and the backup copy can be prepared. Furthermore, as comparing with other RAID array, the number of hard disks is decreased.

To achieve above objects, the present invention provides a composite single structured hard disk drive, comprising: a machine casing having a power port and two signal I/O (input/output) ports at an outer surface thereof; an interior of the machine casing having a driving unit which is electrically connected to the power port; the driving unit being able to rotatably drive at least one recoding disk; to rotate in the machine casing; two sides of the disk having respective read/write areas; two read/write modules (R/W modules) being installed, respectively, Each R/W module having a rotatable arm set and a dynamic unit connected to the rotatable arm set; one end the rotatable arm set having at least one R/W head at a front end thereof; the R/W head can be moved to a read/write area of the disk for reading data from or write data to the disk; another end of the rotatable arm set having no the R/W head is connected to the dynamic unit; the dynamic unit being connected to the power port and being controlled by a processor in the substrate in the machine casing; the R/W head being connected to the signal I/O port through the substrate and relative wires.

A plurality of recording disks are arranged in the machine casing, which are driven by the driving unit to rotate in the machine casing. The two rotatable arm sets are arranged at two opposite sides of the disk. Or the two rotatable arm sets are arranged at the same side of the disks; and the disks and the R/W heads of the rotatable arm sets are arranged alternatively.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 2:
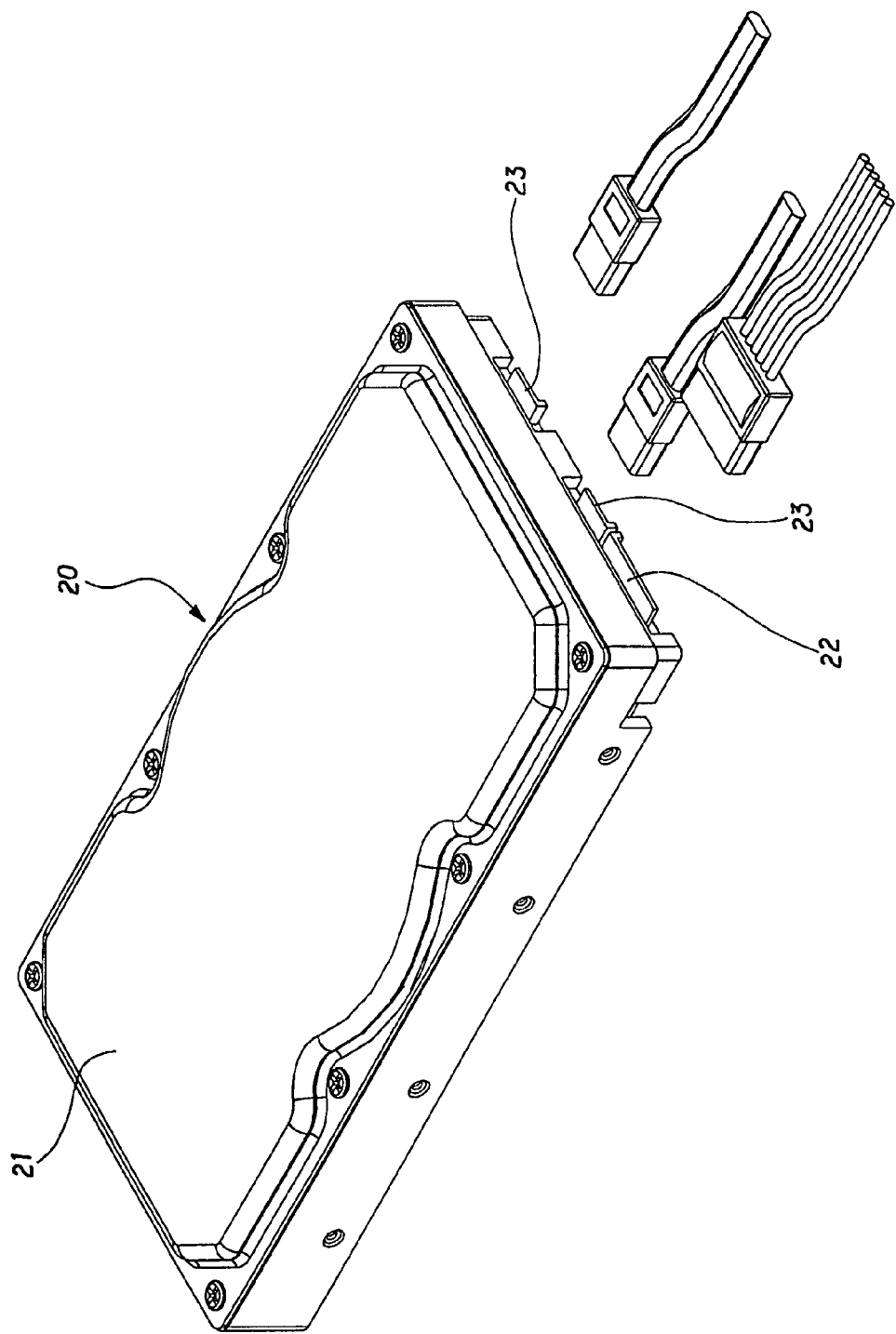
FIG. 2 is a perspective view of the present invention.
Figure 2A:
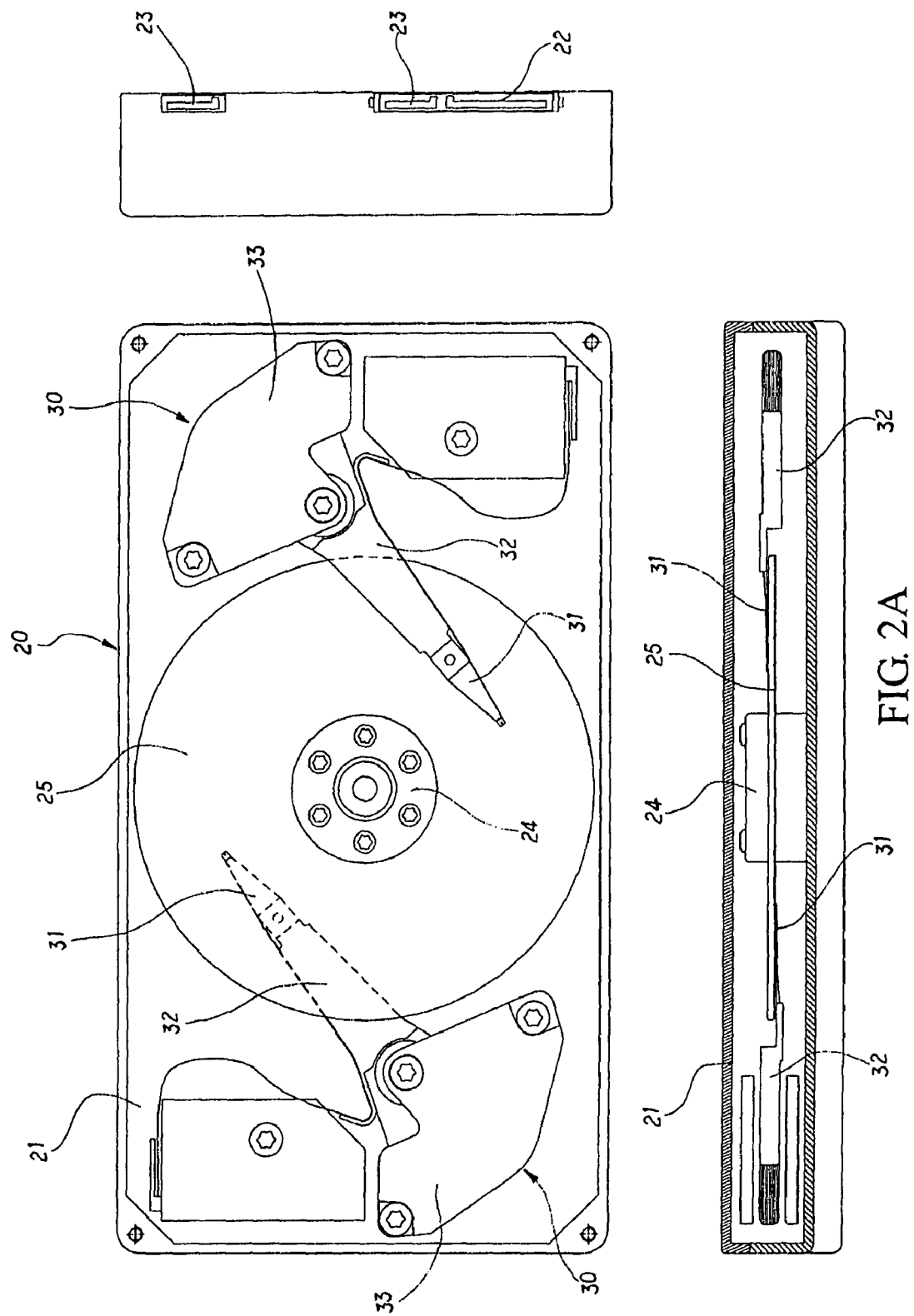
FIG. 2A is a schematic view showing the application of a single disk structure in the present invention.

Referring to FIGS. 2 and 2A, the composite single structured hard disk drive 20 of the present invention is illustrated. The present invention has the following elements.

Figure 1:
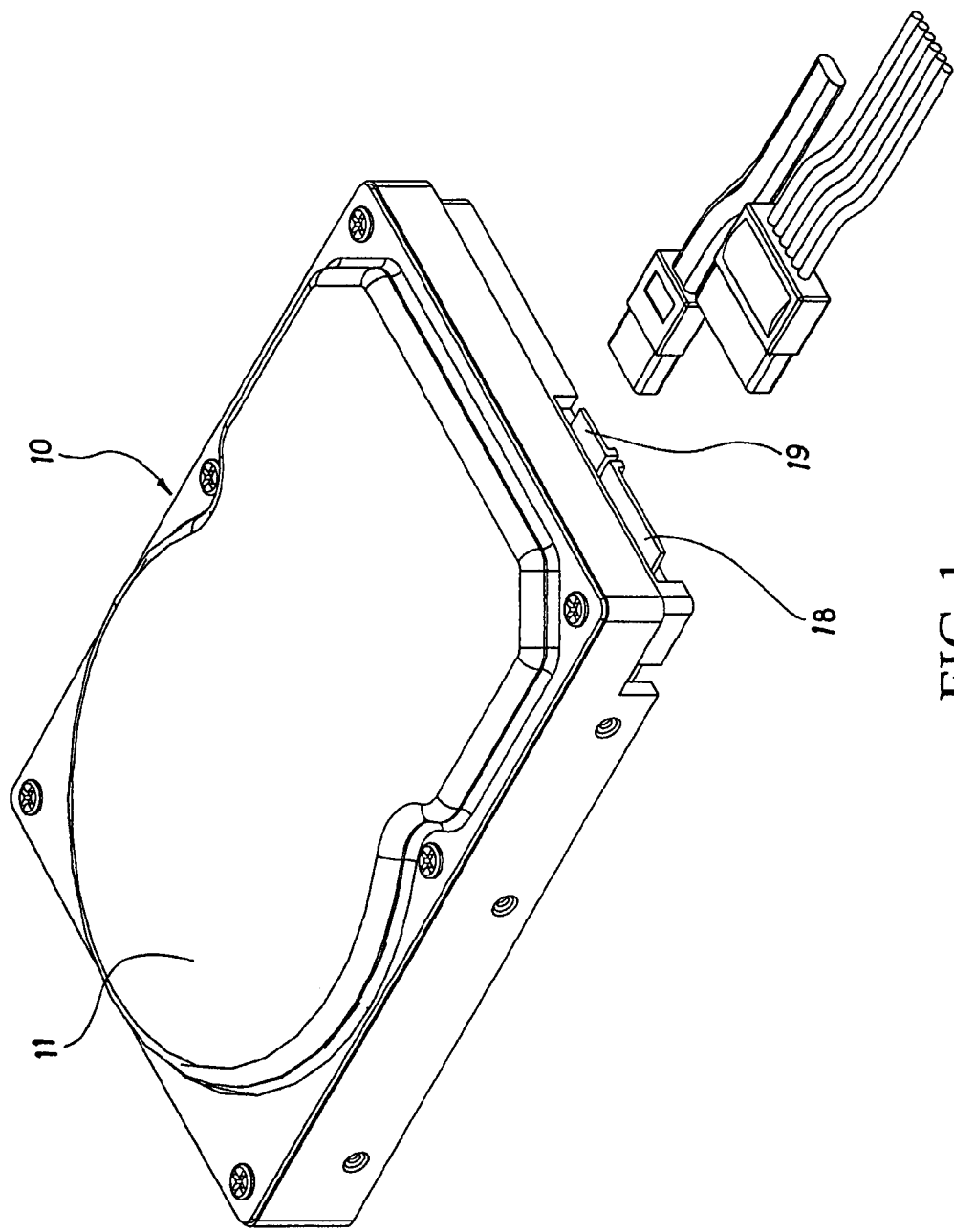
FIG. 1 is a perspective view of a prior art hard disk drive.
Figure 1A:
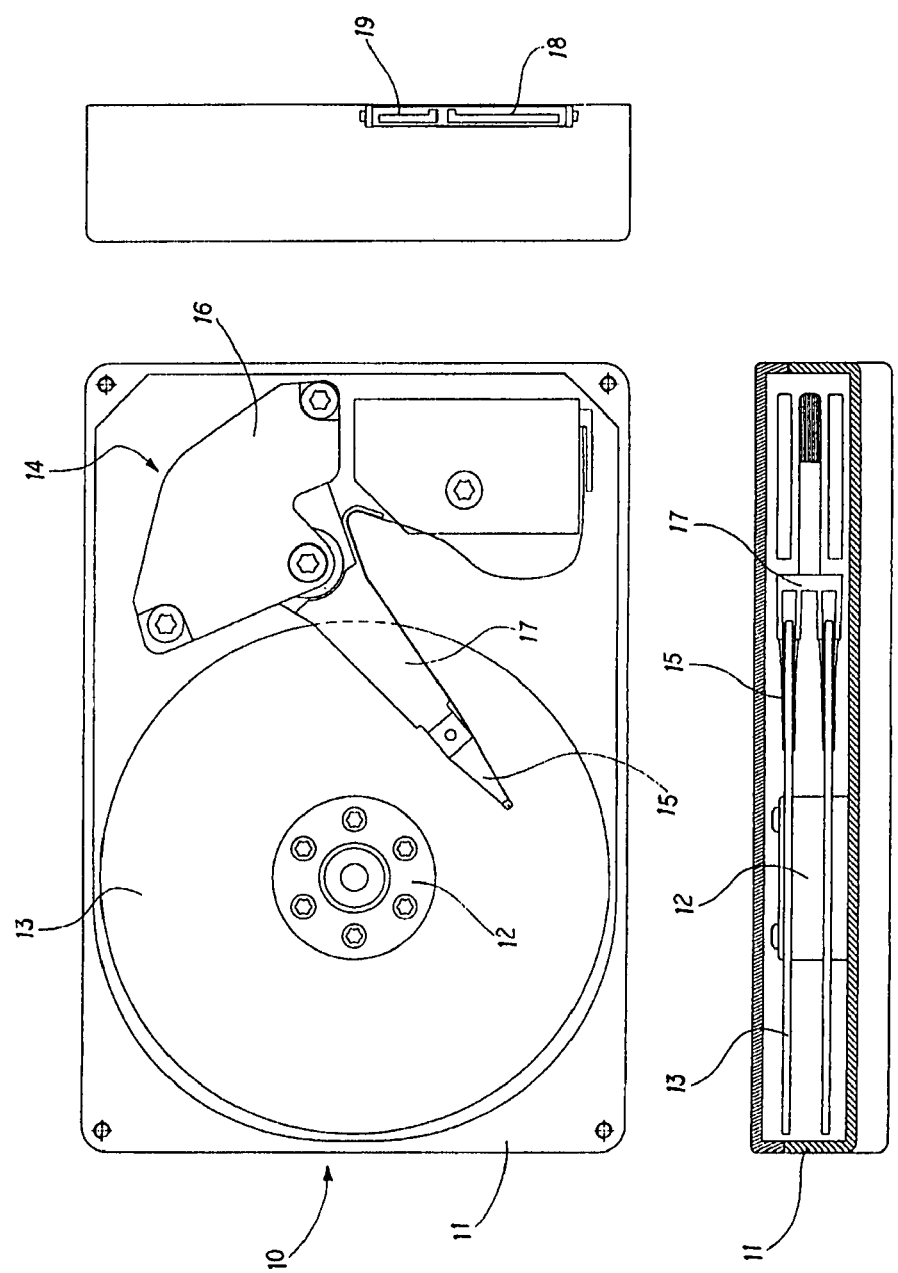
FIG. 1A is a structural schematic view showing an interior of a prior art hard disk drive.
Figure 1B:
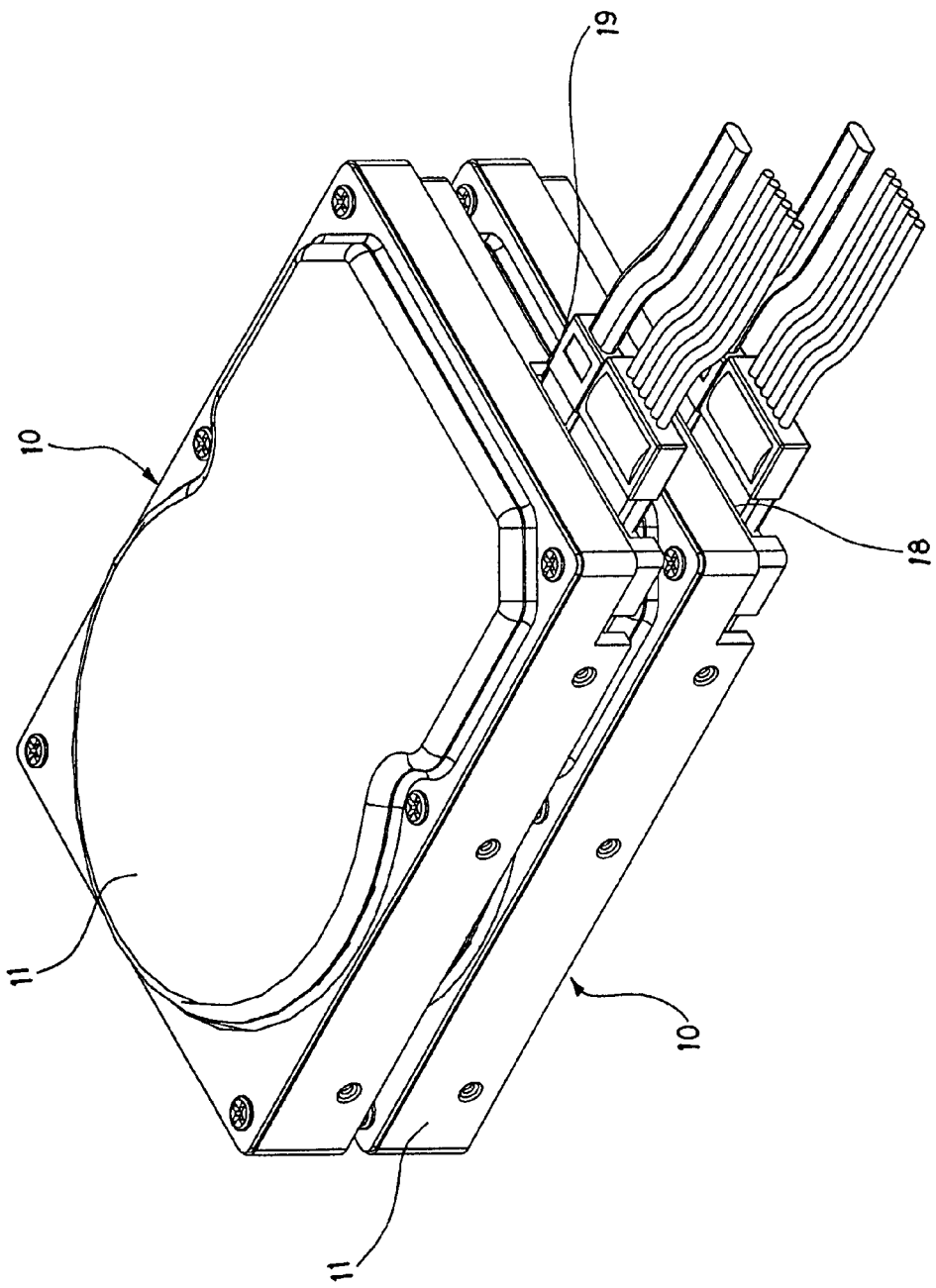
FIG. 1B is a schematic view showing the application of a disk array of a prior art hard disk drive with a RAID 1 structure.
Figure 1C:
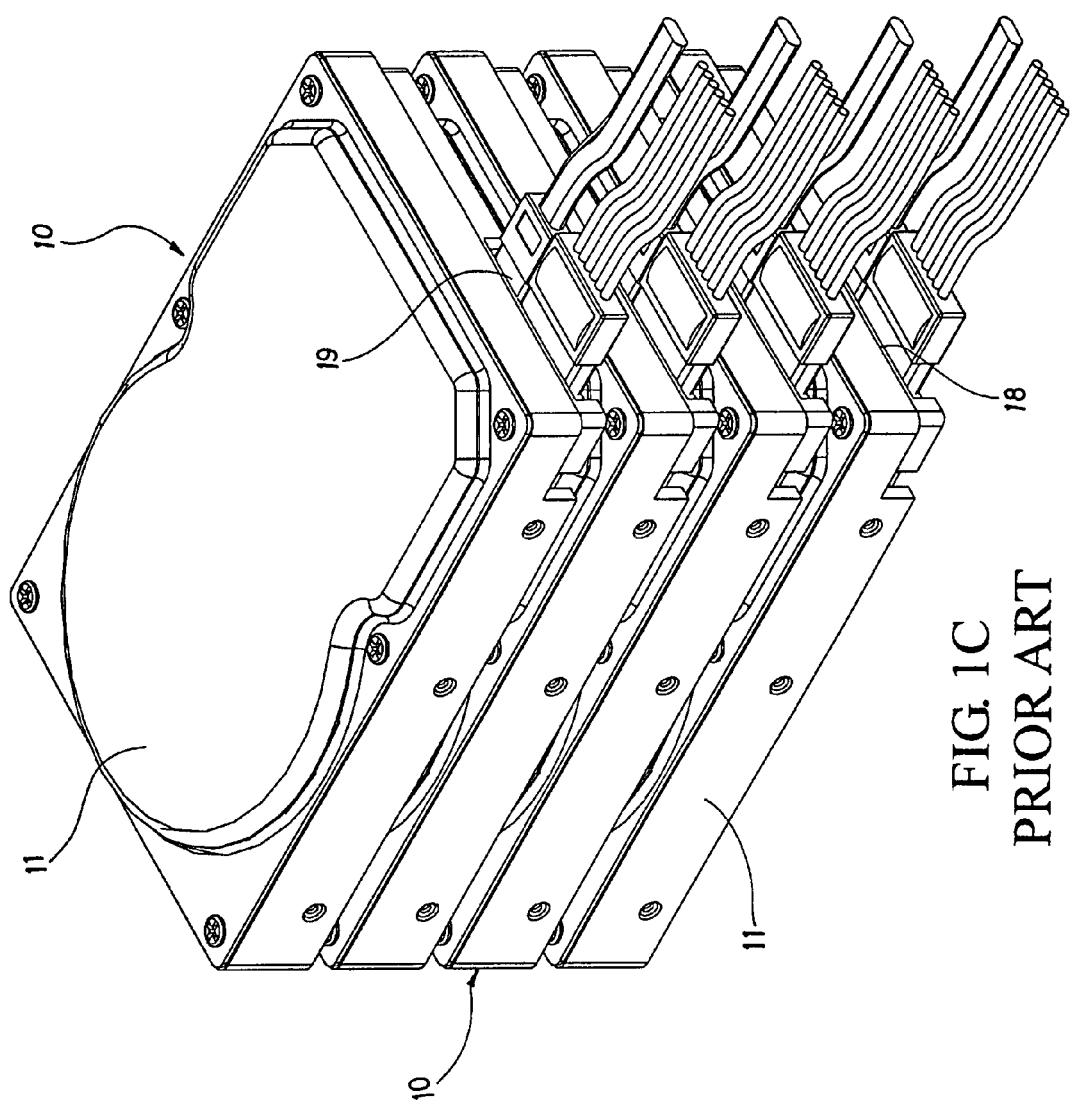
FIG. 1C is a schematic view showing the application of a disk array of a prior art hard disk drive with a RAID 10/01 structure.

A machine casing 21 has a power port 22 and two signal I/O (input/output) ports 23 at an outer surface thereof. An interior of the machine casing 21 has a driving unit 24 which is electrically connected to the power port 22. The driving unit 24 is able to rotatably drive a recording disk 25 (for example a compact disk or a DVD disk), see FIG. 1 to rotate in the machine casing 21. Two sides of the disk 25 have respective read/write areas. However the number of the disk 25 is not confined by one, other number of disks 25 are permissible in the present invention.

Two read/write modules 30 (R/W modules 30) are installed, respectively, at the two opposite sides of the disk 25. Each R/W module 30 has a rotatable arm set 32 and a dynamic unit 33 connected to the rotatable arm set 32. The rotatable arm set 32 has a R/W head 31 at a front end thereof. The R/W head 31 can be moved to a read/write area of the disk 25 for reading data from or write data to the disk 25. Another end of the rotatable arm set 32 having no the R/W head 31 is connected to the dynamic unit 33. The dynamic unit 33 is connected to the power port 22 and is controlled by a processor (not shown) in the substrate (not shown) in the machine casing 21. The R/W head 31 is connected to the signal I/O port 23 through the substrate and relative wires.

By above mentioned structure, a composite single structured hard disk drive 20 of the present invention has two R/W modules 30 and two signal I/O ports 23 and thus it has acted as two real hard disks. If it is used to a hard disk array with a RAID structure, the speed in reading or writing can be increased to two times of the original speed.

Figure 3:
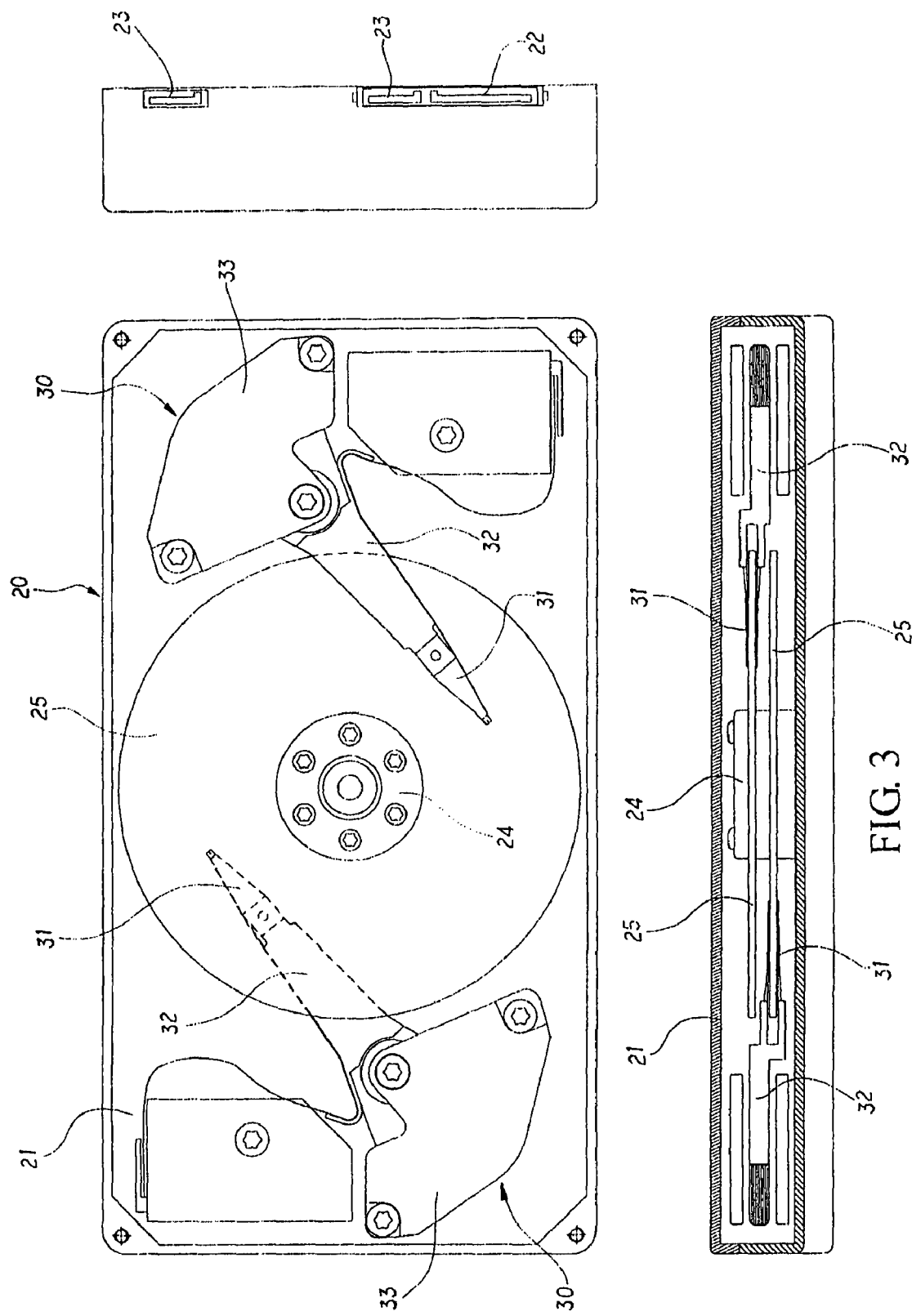
FIG. 3 is a schematic view about the embodiment of two disks in the present invention.
Figure 4:
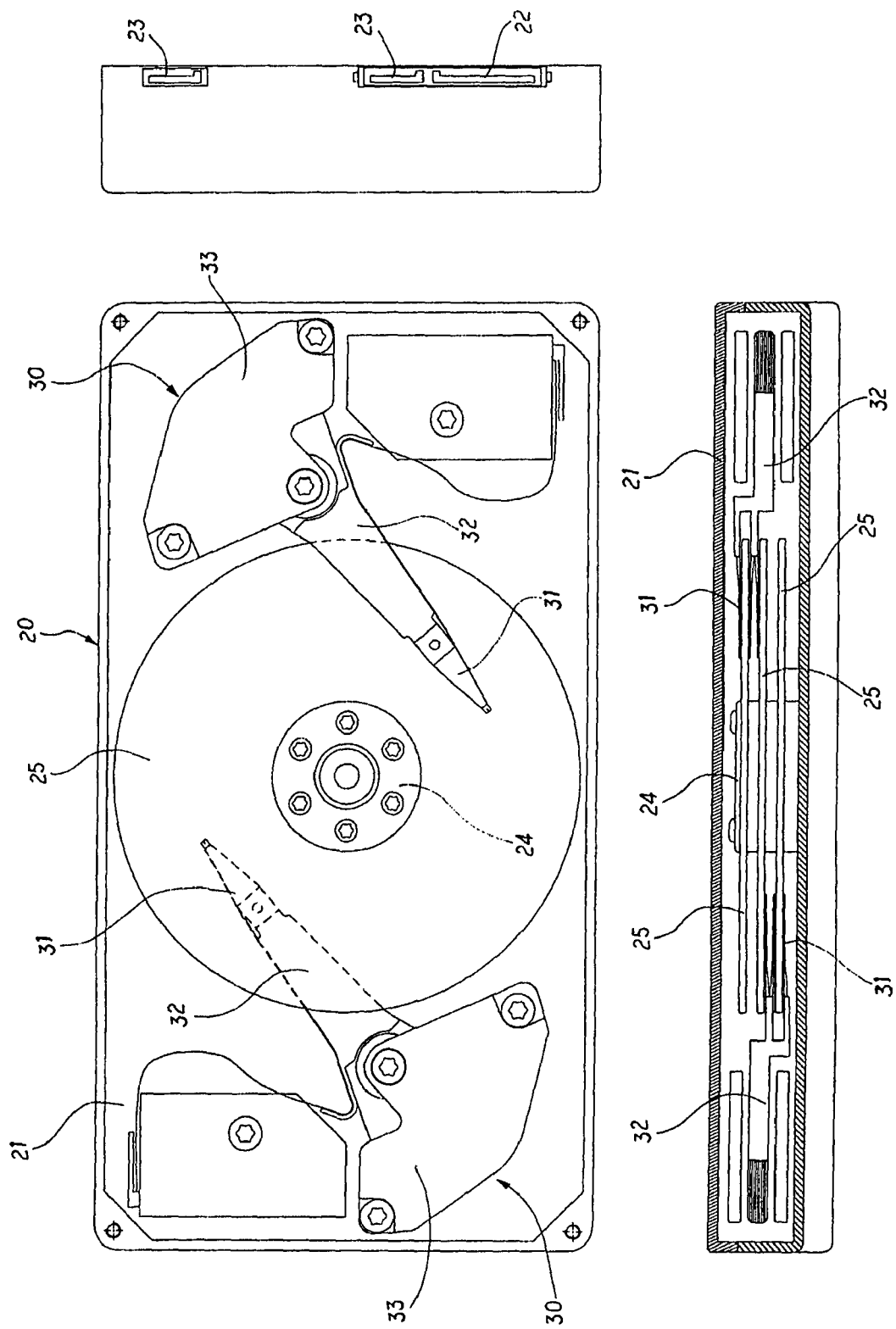
FIG. 4 is a schematic view about the embodiment of three disks in the present invention.

Furthermore, in the present invention, a plurality of disks 25 can be arranged in the machine casing 21, which are driven by the driving unit 24 to rotate in the machine casing 21. In FIG. 3, a structure with two disks 25 are illustrated. In FIG. 4, a structure with three disks 25 are illustrated. At least one surface of the disk 25 has a read/write area. Two R/W modules 30 are installed at two opposite sides of the two disks 25. Similarly, each R/W module 30 includes one rotatable arm sets 32. Each rotatable arm set 32 has at least one R/W head 31. The resisting sections 32 are installed at different surfaces of the R/W heads 31 (referring to FIG. 3) and the R/W heads 31 are arranged as illustrated in FIG. 2A, or as illustrated in FIG. 4, each rotatable arm sets 32 has three R/W heads 31 and there are three disks 25. The R/W heads 31 are alternatively arranged so that the R/W heads 31 are alternatively arranged to be arranged on different read/write areas of the disks 25. Thereby one composite single structured hard disk drive 20 can be acted as having two real hard disks drives.

Figure 5:
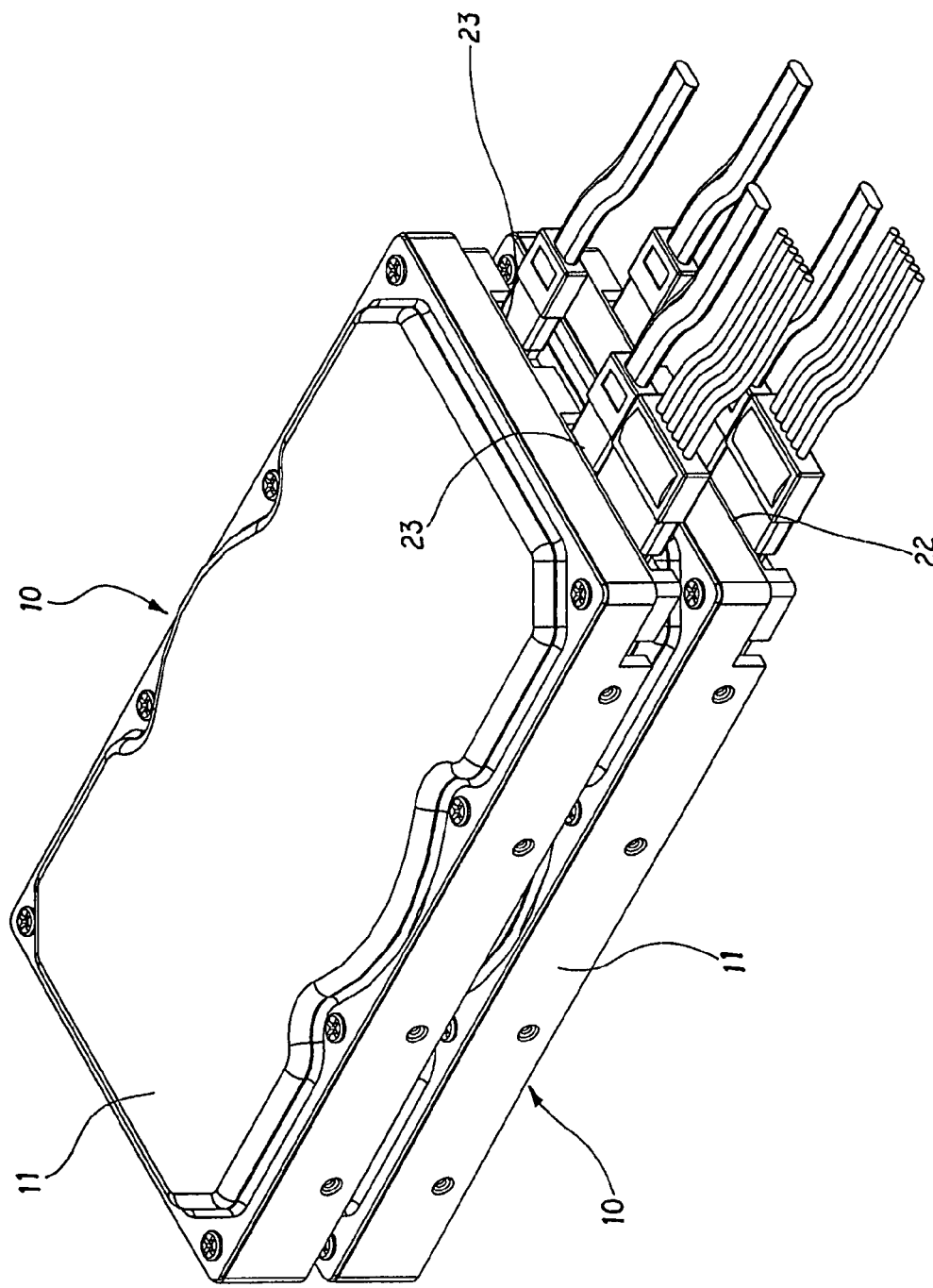
FIG. 5 is a schematic view showing the application of the disk array of the present invention with a RAID 10/01 structure.

Referring to FIG. 5, it is illustrated that the composite single structured hard disk drive 20 of the present invention uses the hard disk array of RAID 10/01 structure. A single composite single structured hard disk drive 20 has two R/W modules 30 and two signal I/O ports 23, which is acted as having two hard disk drives. As comparing with the prior art RAID 10/01 technology, which needs four hard disks, the present invention uses only two hard disk drives. Not only the space is saved and the cost is down, but also the operation speed is increased and a backup copy can be built by using the structure of the present invention. Moreover, the wire arrangement is simplified so that the installation and repair work can be done easily.

Figure 6:
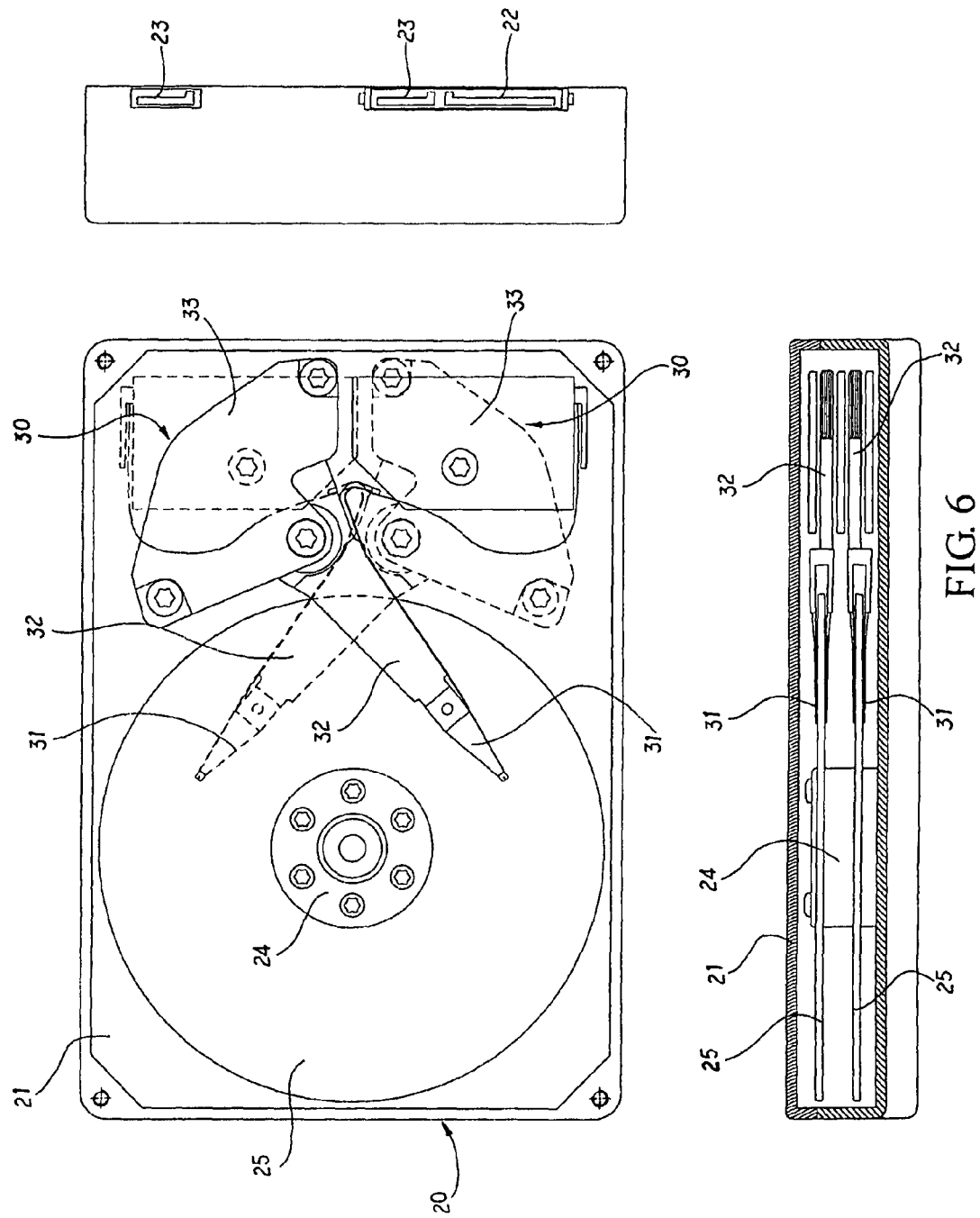
FIG. 6 is a schematic view showing the installation of the present invention.

Referring to FIG. 6, another embodiment of the present invention is illustrated. In this the present invention, the composite single structured hard disk drive includes a machine casing 21. A power port 22 and two signal I/O ports 23 are arranged on the outer surface of the machine casing 21. An interior of the machine casing 21 is installed with a driving unit 24 which is connected to the power port 22 and rotatably drives the disks 25 to rotate within the machine casing 21. Two surfaces of each disk 25 have respective read/write area.

Figure 7:
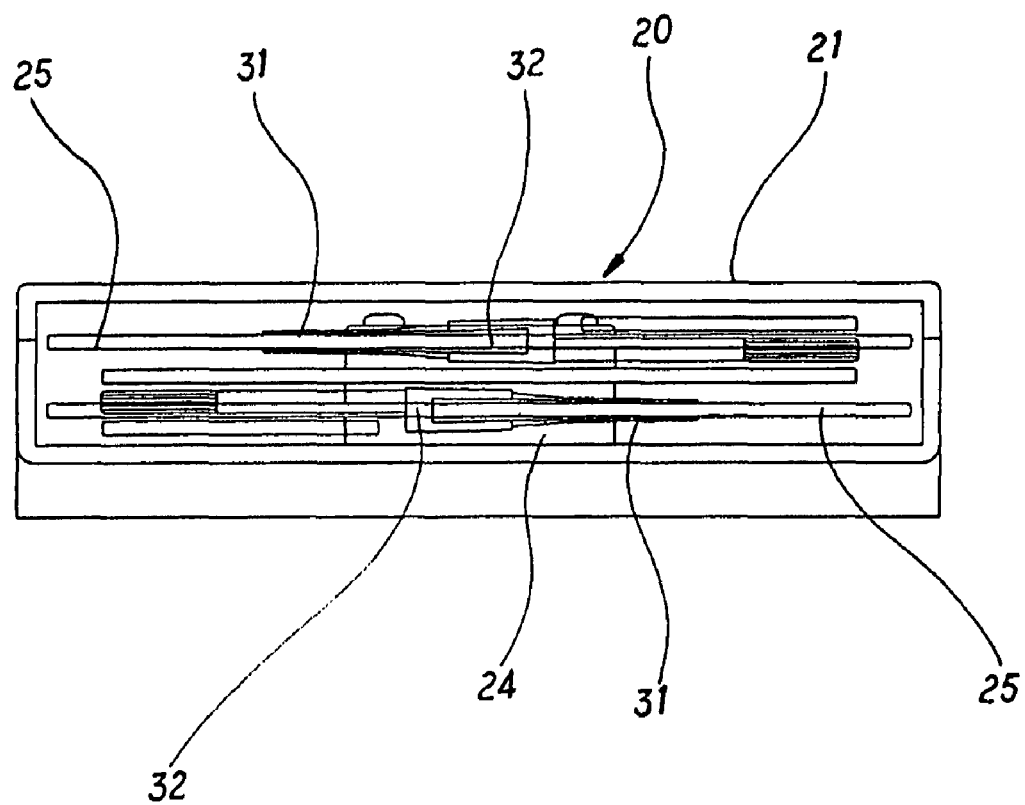
FIG. 7 is a schematic view of the present invention.

Moreover, two R/W modules 30 are installed in the machine casing 21. The two R/W modules 30 are installed at the same side of the disks 25. The R/W modules 30 and disks 25 are alternatively arranged (referring to FIG. 7). Each R/W module 30 has two rotatable arm sets 32. One end of each rotatable arm sets 32 has two R/W heads 31. Another end of the each rotatable arm set 32 is connected to a dynamic unit 33. Two R/W heads 31 of one rotatable arm set 32 are arranged at two sides of one disk 25. In operation, each R/W head 31 is arranged to the read/write area of the respective surface of the respective disk 25 for writing data to the disk 25 or reading data from the disk 25. The operation of the dynamic unit 33 is controlled by a processor (not shown) in a substrate (not shown). The dynamic unit 33 is also connected to the power port 22. The R/W heads 31 are connected to the signal I/O port 23 through the substrate and wires.

By above mentioned structure, the R/W modules 30 are installed and positioned. The length and specification of the machine casing 21 are unnecessary to be changed, while the object of composite single structured hard disk drive is achieved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A composite single structured hard disk drive, comprising:
   a machine casing having a power port and two signal I/O (input/output) ports at an outer surface thereof; an interior of the machine casing having a driving unit which is electrically connected to the power port; the driving unit being able to rotatably drive at least one recoding disk; to rotate in the machine casing; two sides of the disk having respective read/write areas;
   two read/write modules (R/W modules) being installed in the machine casing, respectively, and being separately, individually and electrically connected to the two signal I/O ports.

* * * * *